UNITED STATES PATENT OFFICE.

ARTHUR GEORGE GREEN, OF LEEDS, ENGLAND.

MANUFACTURE OF PICRIC ACID.

1,299,171.    Specification of Letters Patent.    Patented Apr. 1, 1919.

No Drawing.    Application filed January 29, 1916. Serial No. 75,023.

*To all whom it may concern:*

Be it known that I, ARTHUR GEORGE GREEN, B. Sc., F. R. S., F. I. C., subject of the King of Great Britain and Ireland, residing in the University of Leeds, Leeds, in the county of York, England, professor of applied chemistry, have invented certain new and useful Improvements in the Manufacture of Picric Acid, of which the following is a specification.

The ordinary method of manufacturing picric acid from phenol is subject to several disadvantages. In the first place it is dependent upon the available supplies of phenol, which if much in demand is liable to rise to a high price. In the second place the nitration of phenol, as usually carried out, only gives a yield of 70 to 75% of the theoretical amount, and owing to the fact that the operation has to be performed in presence of water cannot be effected in iron or lead-lined vessels but necessitates the employment of earthenware pots. This fact generally restricts the size of the charge and as the operation requires about two days for completion, the output is correspondingly limited. Furthermore the manufacturing operation is an unpleasant one, the large quantities of nitrous fumes evolved being a danger to the health of the workmen and a nuisance to the surrounding neighborhood.

I have now invented a process of manufacturing picric acid which overcomes these difficulties and has the following advantages:

(1) It is independent of the supplies of phenol. The primary raw material, being benzene, is much cheaper and subject to very little fluctuation in price.

(2) The loss in manufacture is very small as the reactions occur nearly theoretically.

(3) The operations can be conducted in large charges and in cast-iron nitrating vessels, thus greatly increasing the output.

(4) The evolution of nitrous fumes is very small.

(5) The waste sulfuric acid from the nitration can be readily reconcentrated as it contains no by-products.

The process consists in the nitration under special conditions of dinitrophenol in the presence of sulfuric acid. According to the invention dinitrophenol is nitrated in presence of concentrated sulfuric acid with about one molecular equivalent of nitric acid, the nitric acid being either employed as such or generated in the mixture from sodium nitrate. The dinitrophenol itself is most conveniently produced by chlorinating benzene to monochlorobenzene, nitrating the latter with a mixture of nitric acid and surfuric acid to dinitrochlorobenzene, and conversion of this into dinitrophenol by boiling with caustic alkali. The entire chain of reactions, starting from benzene, is therefore the following:—

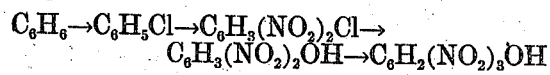

As the conditions for carrying out the first three steps are well known, it is only necessary to describe in detail the best way of effecting the last step in the conversion i. e. the nitration of dinitrophenol as above mentioned. This is effected in presence of concentrated sulfuric acid employing one molecular proportion (or slightly more) of strong nitric acid. The process is carried out for example in the following manner: —

In a round-bottomed cast-iron pot, provided with a cast-iron agitator, 500 lbs. of dinitrophenol in powder (containing 8% of water) is stirred with 2,000 lbs. of cold concentrated sulfuric acid (95% $H_2SO_4$). Into this mixture is run within a period of about five minutes a mixture of 180 lbs. of nitric acid (90% $HNO_3$) and 200 lbs. of concentrated sulfuric acid. The temperature of the mixture rises rapidly to about 100° C. the dinitrophenol dissolves, and ultimately picric acid separates in the form of small crystals. After standing for about ten minutes to complete the reaction, the mixture is cooled down to about 40° C. and is then run into a wooden vat containing about 7000 lbs. of cold water or of wash water obtained from a previous batch. The liquor, still warm, is run on to a suction filter, the picric acid which remains on the filter being then washed free from sulfuric acid by means of cold or warm water, and dried. The yield is nearly theoretical (about 110% of the damp dinitrophenol) and the product is of standard quality.

An alternative method of separating the picric acid from the waste sulfuric acid which permits of the latter being obtained at a higher strength (about 80% $H_2SO_4$), consists in adding to the mixture after nitration and cooling about 20 gallons of cold water. This causes the crystallization of almost all the picric acid, which is then separated from the waste sulfuric acid by filtration through acid resistant material, from which it is subsequently transferred to water and washed free from sulturic acid.

Retaining the above proportion of sulfuric acid, the nitric acid may be replaced if desired by dry sodium nitrate (one molecular proportion) which is added quickly in powder with rapid stirring. In this case however the recovery of the waste sulfuric acid presents difficulties.

What I claim and desire to secure by Letters Patent is:—

1. A process for the manufacture of picric acid, comprising nitrating dinitrophenol in presence of concentrated sulfuric acid with about one molecular proportion of nitric acid.

2. A process for the manufacture of picric acid, comprising nitrating dinitrophenol with about one molecular proportion of nitric acid in presence of concentrated sulfuric acid, to form picric acid, cooling the mixture and separating and washing the picric acid.

3. A process for the manufacture of picric acid, comprising nitrating dinitrophenol with about one molecular proportion of nitric acid in presence of concentrated sulfuric acid, to form picric acid, cooling the mixture, treating same with water, separating and washing the picric acid.

4. A process for the manufacture of picric acid, comprising treating about 500 parts of dinitrophenol with about 2200 parts of concentrated sulfuric acid and about a molecular proportion of strong nitric acid, cooling the resulting nitration mixture, diluting same with water, separating and washing the picric acid, substantially as described.

5. A process for the manufacture of picric acid, comprising treating a mixture of about 500 parts of dinitrophenol and about 2000 parts of concentrated sulfuric acid with a mixture of about 180 parts of strong nitric acid and about 200 parts of concentrated sulfuric acid, cooling the resulting nitration mixture, adding same to about 7000 parts of water, separating from the mixture the picric acid formed and washing the same, substantially as described.

In witness whereof I have hereunto signed my name in the presence of two subscribing witnesses.

ARTHUR GEORGE GREEN.

Witnesses:
HARRY HYMANN,
WILFRID ARMITAGE.